United States Patent [19]

Murakoshi et al.

[11] 4,270,404
[45] Jun. 2, 1981

[54] X-Y MOVEMENT MECHANISM

[75] Inventors: Makoto Murakoshi; Tamotu Yoshizawa, both of Asaka, Japan

[73] Assignee: Fuji Photo Film Co., Ltd., Ashigara, Japan

[21] Appl. No.: 32,823

[22] Filed: Apr. 24, 1979

[30] Foreign Application Priority Data

Apr. 27, 1978 [JP] Japan ................. 53/50398

[51] Int. Cl.³ .................. G05G 11/00; F16H 25/20
[52] U.S. Cl. ..................... 74/479; 33/1 M;
74/89.15; 74/89.17; 74/89.18; 74/422; 74/424.8 R; 350/86
[58] Field of Search ............ 74/422, 424.8 R, 89.15, 74/89.17, 89.18, 479; 108/143; 33/1 M; 350/86; 269/71

[56] References Cited

U.S. PATENT DOCUMENTS

| 3,304,552 | 2/1967 | Perschy | 33/1 M X |
| 3,555,916 | 1/1971 | Santy | 74/89.15 |
| 3,613,464 | 10/1971 | Archer | 74/89.15 |
| 3,785,316 | 1/1974 | Leming et al. | 74/479 X |

FOREIGN PATENT DOCUMENTS

| 2124986 | 10/1978 | Fed. Rep. of Germany | 74/479 |
| 194508 | 6/1965 | U.S.S.R. | 33/1 M |

Primary Examiner—Allan D. Herrmann
Attorney, Agent, or Firm—Sughrue, Rothwell, Mion, Zinn and Macpeak

[57] ABSTRACT

An X-Y movement mechanism, having right-handed and left-handed lead screws arranged in parallel with each other and drive sources for individually rotating the lead screws. Gears placed over nuts engage the lead screws, the gears having teeth coaxially with said nuts. A base plate, either flat or cylindrical has a stage slidable thereon. A rack is fixedly provided on the stage to engage the gears. The gears operate as a gear transmission mechanism permitting the rack to move in a direction perpendicular to the direction of the axes of the lead screws and in the direction of the axes of the lead screws.

13 Claims, 6 Drawing Figures

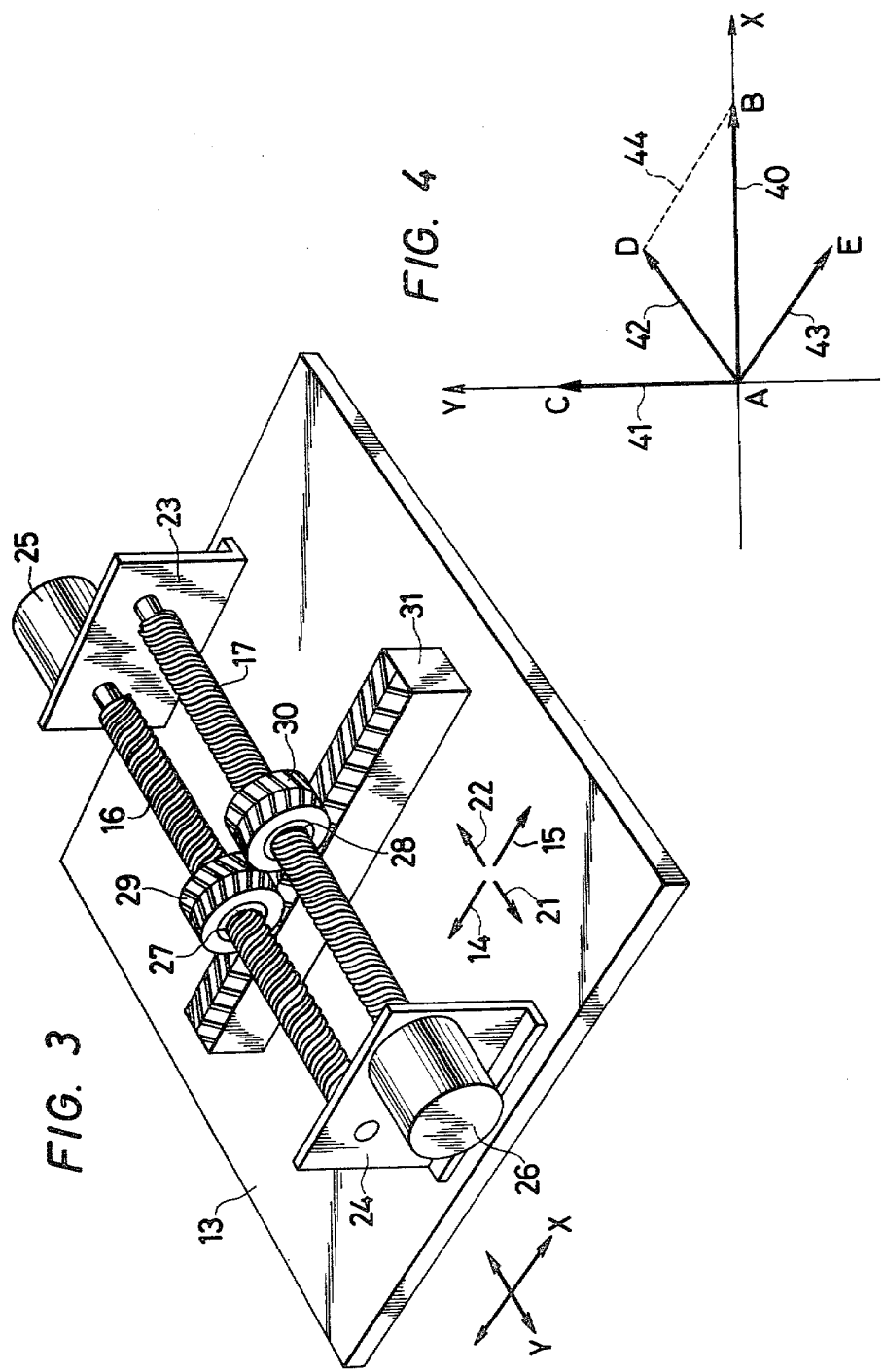

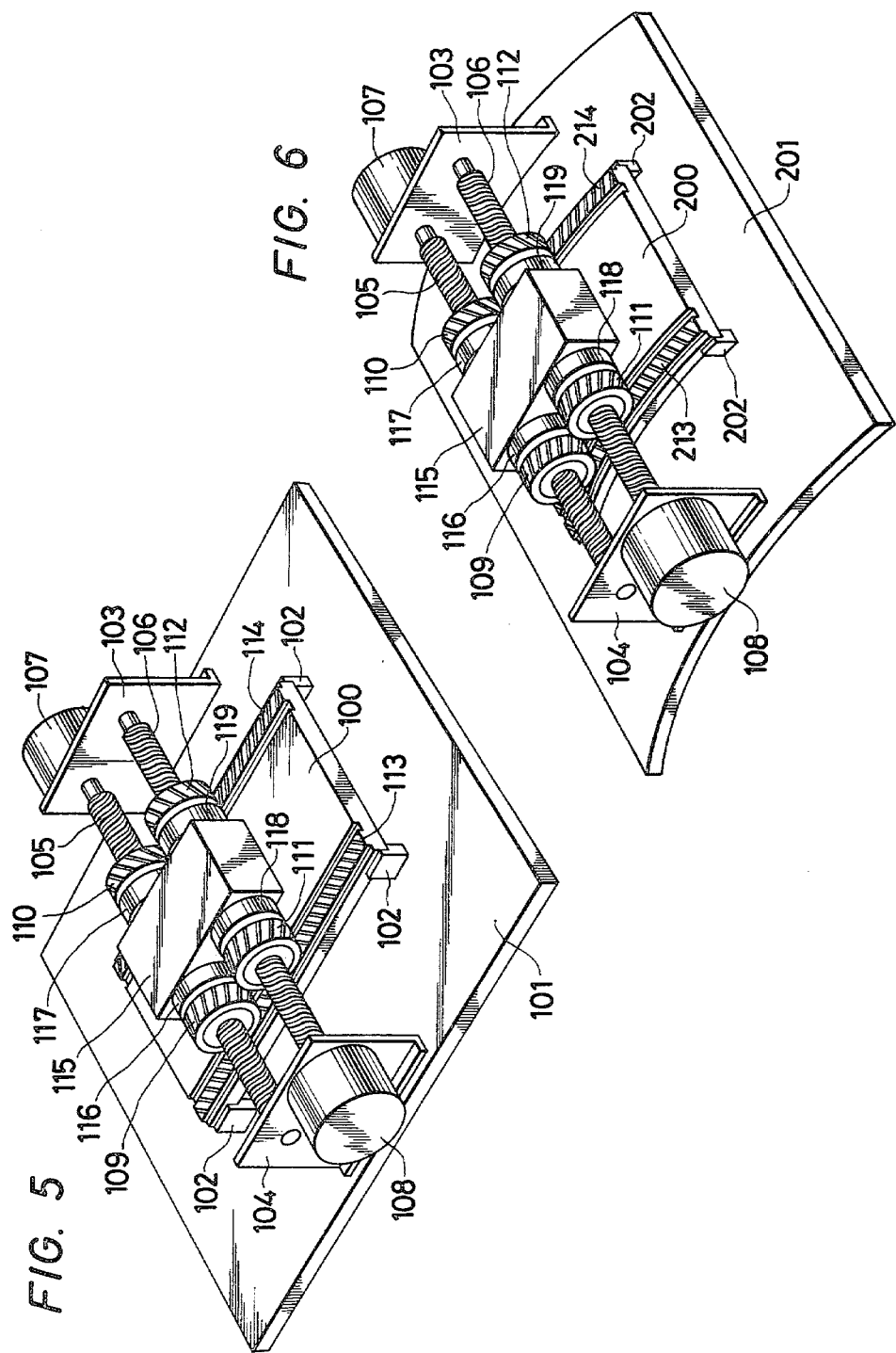

X-Y MOVEMENT MECHANISM

BACKGROUND OF THE INVENTION

This invention relates to a mechanism for moving a stage on a planar or cylindrical surface.

Mechanisms for moving a stage on a planar surface are extensively employed in various fields, for example, a microfilm moving device in photographing or retrieving of microfilm, an integrated circuit inspecting device, or a drafting plotter. In these movement mechanisms, it is necessary to move the stages quickly with a short settling time and high accuracy. For instance, in a computer output microfilmer (COM) for providing the output of a computer in the form of microfilm, it is necessary to move a stage holding a film to predetermined positions at high speed with high accuracy to successively photograph the output of the computer.

In order to photograph the output of the computer immediately after the movement of the stage, it is necessary to quickly damp the vibration of the stage as soon as the stage is moved to the predetermined position. That is, the settling time which elapses from the instant that a drive source (such as an electric motor) for moving the stage is stopped until the vibration of the stage caused by the movement is stopped should be as short as possible. However, the settling time of a conventional movement mechanism is not sufficiently short, and accordingly, it is necessary to improve the movement mechanism to provide a satisfactory high-speed COM.

X-Y movement mechanisms for microfilm cameras have been disclosed in a number of specifications of Japanese Patents. Typical are publication No. 14266/1974, Japanese Patent Application Laid-Open Nos. 63722/1973 and 3816/1978, and Japanese Utility Model Laid-Open Nos. 6640/1978 and 6641/1978. In each of these conventional X-Y movement mechanisms, the stage is moved by one motor for moving it exclusively in the X-direction and a second motor for moving it exclusively in the Y-direction. In most of these conventional movement mechanism, one (Y-direction) movement mechanism is placed over the other (X-direction). Accordingly, the motor for moving the stage in the X-direction should output a greater torque. Furthermore, in order to transmit the power in the Y-direction, it is necessary to use spline means or to place the motor itself on a carriage. Thus, in these conventional movement mechanisms, it is necessary to use motors which can provide great torque, and use intricate mechanisms to transmit the power thereof. Accordingly, it is difficult to minimize the size of the movement mechanisms.

SUMMARY OF THE INVENTION

Accordingly, an object of this invention is to provide an X-Y movement mechanism in which all of the above-described drawbacks accompanying a conventional X-Y movement mechanism have been eliminated.

Another object of the invention is to provide an X-Y movement mechanism which can move not only on a planar surface but also on a cylindrical surface.

According to the invention, an X-Y movement mechanism comprises a right-handed lead screw and a left-handed lead screw arranged in parallel with each other. Drive sources are provided for rotating the lead screws individually. Gear places over nuts engage with the lead screws, the gears having teeth coaxially with the nuts. A base plate has a flat surface in parallel with the axes of the lead screws or a cylindrical surface whose rotational axis is in parallel with the axes of the lead screws and a stage is slidable on the base plate. A rack is fixedly provided on the stage to engage with the gears with the gears operating as a gear transmission mechanism which permit the rack to move in a direction perpendicular to the direction of the axes of the lead screws but in the direction of the axes of the lead screws.

The principles of a movement mechanism according to this invention will be described one after another. For convenience in description, a two-dimensional movement on an X-Y plane will be first described. That is, first the movement in the X-direction, and then the movement in the Y-direction will be described. Thereafter, the principle of movement in a direction obtained by combining the two directions will be described. Finally, various examples of a two-dimensional movement mechanism will be described.

BRIEF DESCRIPTION OF THE DRAWINGS

FIG. 3 is a diagram for a description of a principle of moving a rack with two screws in the X-Y directions;

FIG. 4 is a diagram indicating the vectors of movement of the two screws shown in FIG. 3;

FIG. 5 is a perspective view showing one example of a movement mechanism according to the invention, which moves on a planar surface; and FIG. 6 is a perspective view showing another example of the movement mechanism according to the invention, which moves on a cylindrical surface.

DESCRIPTION OF THE PREFERRED EMBODIMENTS

Figure 1:
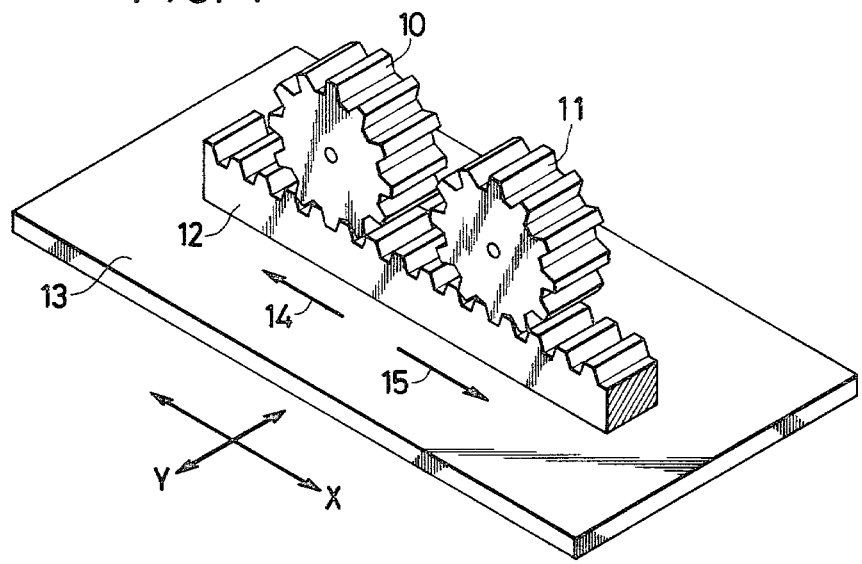
FIG. 1 is a diagram for a description of a principle of moving a rack with two gears in the X-direction.

Described now is the principle of movement in the X-direction. FIG. 1 shows two gears 10 and 11 having the same pitch and engaging a rack 12. The rack 12 is placed on a flat base plate 13. It is assumed that the rotating shaft of the gear 10 is in parallel with that of the gear 11, and that these shafts are supported on bearings (not shown) so that they are individually rotated by respective drive sources. The directions of movement of the rack 12 caused by the rotations of the two gears 10 and 11 are as indicated in Table 1 below:

TABLE 1

| Direction of rotation of the gear 10 | Direction of rotation of the gear 11 | Direction of movement of the rack 12 | |
|---|---|---|---|
| clockwise | clockwise | Arrow 14 | X-direction |
| counterclockwise | counterclockwise | Arrow 15 | |
| clockwise | counterclockwise | Not moved | |
| counterclockwise | clockwise | Not moved | |

When the gears 10 and 11 are rotated clockwise, then the rack 12 is moved in the direction 14 and when the gears are rotated counterclockwise, then the rack 12 is moved in the direction 15. When the direction of rotation of the gear 10 is opposite to the direction of rotation of the gear 11, then the rack 12 is not moved, and the gears cannot be rotated. That is, when the directions of movement of the two gears are the same, the rack is moved in the X-direction, either plus or minus, and otherwise, the rack is locked.

Figure 2:
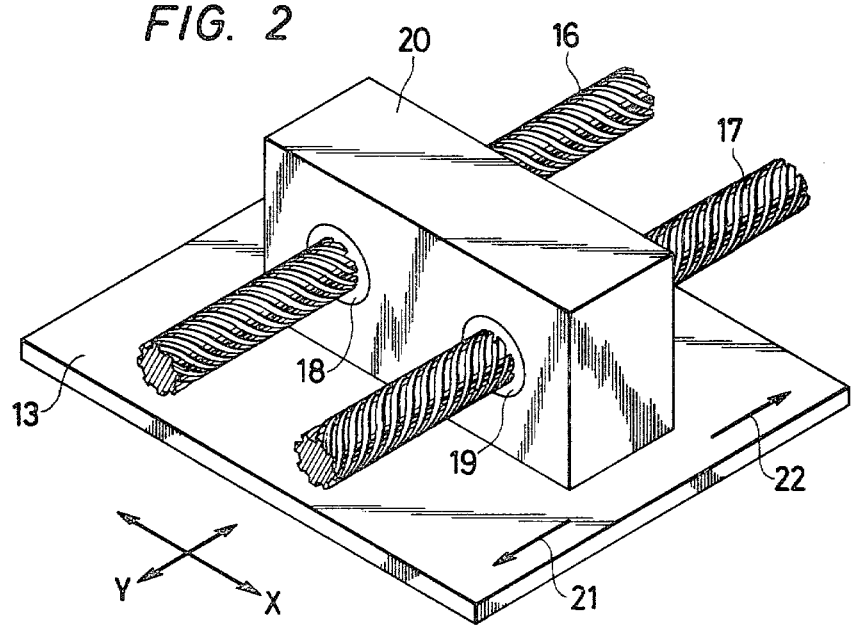
FIG. 2 is a diagram for a description of a principle of moving a block with two screws in the Y-direction.

The principle of movement in the Y-direction will be described with reference to FIG. 2. Two lead screws 16 and 17 (hereinafter referred to merely as "screws 16 and 17" when applicable) in parallel with each other are screwed into nuts 18 and 19 embedded in a block 20, respectively. The screw 16 is a left-handed screw, while the screw 17 is a right-handed screw. The rotating shafts of the screws 16 and 17 are supported on bearings (not shown) so that they are individually rotated by drive sources, respectively. The directions of movement of the block 20 caused by the rotations of the screws 16 and 17 are as indicated in Table 2 below.

TABLE 2

| Direction of rotation of the screw 16 | Direction of rotation of the screw 17 | Direction of movement of the block 20 | |
|---|---|---|---|
| clockwise | clockwise | Not moved | |
| counterclockwise | counterclockwise | Not moved | |
| clockwise | counterclockwise | Arrow 21 | } Y-direction |
| counterclockwise | clockwise | Arrow 22 | |

In this connection, it is assumed that the block 20 is movable on a flat base plate 13. When the screws 16 and 17 are rotated clockwise and counterclockwise, respectively, then the block 20 is moved in the direction 21 because the nuts 18 and 19 are fixedly secured to the block 20. When the screws 16 and 17 are rotated counterclockwise and clockwise, respectively, then the block 20 is moved in the direction 22. However, when the directions of rotation of the two screws are the same, then the block is not moved and the screws cannot be moved. That is, when the direction of rotation of the two screws are not the same, the block is moved in the direction of Y.

Now, a two-dimensional movement mechanism obtained by combining the above-described two different mechanisms so as to be movable in the X and Y directions will be described with reference to FIG. 3. Supporting plates 23 and 24 are fixedly secured to a flat base plate 13 as shown in FIG. 3. Screws 16 and 17 are rotatably journaled through bearings on the supporting plates 23 and 24, respectively, in such a manner that the screws 16 and 17 are in parallel with each other and the base plate 13. Motors 25 and 26 are fixedly mounted on the supporting plates 23 and 24 to individually rotate the screws 16 and 17, respectively. Nuts 27 and 28 are placed over the screws 16 and 17, and double-helical gears 29 and 30 are formed on the outer walls of the nuts 27 and 28 as shown in FIG. 3.

The double-helical gears 29 and 30 engage with a rack 31 having a double-helical gear, which is movable on the base plate 13. The reason for the provision of the double-helical gears is that the nuts are maintained engaged with the rack even when a force in the Y-direction is applied thereto. It is preferable that the teeth of each double-helical gear form substantially 90°, because the play between the gears is reduced.

The directions of movement of the rack 31 with respect to the directions of rotation of the screws 16 and 17 are as indicated in Table 3 below:

TABLE 3

| Direction of rotation of the screw 16 | Direction of rotation of the screw 17 | Direction of movement of the rack 31 | |
|---|---|---|---|
| clockwise | clockwise | Arrow 14 | } X- |

TABLE 3-continued

| Direction of rotation of the screw 16 | Direction of rotation of the screw 17 | Direction of movement of the rack 31 | |
|---|---|---|---|
| counterclockwise | counterclockwise | Arrow 15 | direction |
| clockwise | counterclockwise | Arrow 21 | } Y-direction |
| counterclockwise | clockwise | Arrow 22 | |

When the screws 16 and 17 are rotated clockwise, then the nut 27 tends to move in the direction of the arrow 21, while the nut 28 tends to move in the direction of the arrow 22. However, the helical gears 29 and 30 of the nuts 27 and 28 tend to move the rack 31 in the opposite directions, and therefore the rack 31 is not moved in the Y-direction, and the nuts 27 and 28 are not moved with respect to the screws 16 and 17, respectively. However, in this case, the nuts 27 and 28 tend to turn clockwise integrally with the screws 16 and 17, respectively, and therefore the helical gears 29 and 30 are turned clockwise, and the double-helical gear rack 31 is moved in the direction of the arrow 14. Similarly, when the screws 16 and 17 are turned counterclockwise, then the double-helical gear rack 31 is moved in the direction of the arrow 15.

When the screw 16 is rotated clockwise and the screw 17 is rotated counterclockwise, then the nuts 27 and 28 are moved in the direction of the arrow 21. In this case, the double-helical gears 29 and 30 cannot turn in the opposite directions because they are engaged with the double-helical gear rack 31. Therefore, the rack 31 is moved in the direction of the arrow 21. Similarly, when the screw 16 is rotated counterclockwise and the screw 17 is rotated clockwise, the rack 31 is moved in the direction of the arrow 15. Hence, the rack 31 is moved in either the X or Y direction by suitably combining the directions of rotation of the screws.

In the above description, the movement is in a direction in parallel with the X or Y direction. However, the movement mechanism can move the double-helical rack 31 in a direction other than those directions (obliquely) by rotating only one of the two screws. The case where, for instance, only the screw 16 is rotated counterclockwise and the screw 17 is not rotated, will next be described.

When the screw 16 is rotated counterclockwise, then the nut 27 is also rotated counterclockwise to permit the rack 31 to move in the direction of the arrow 15 through the double-helical gear 29. In order to move the rack 31 in the direction of the arrow 15, it is necessary to rotate the gear 30 counterclockwise. Therefore, the nut 28 is rotated counterclockwise; however, the nut 28 tends to move in the direction of the arrow 22 while being rotated counterclockwise because the screw 17 is not rotated. In this case, as the rack 31 is engaged with the gear 30, the rack 31 tends to move in the direction of the arrow 22, as a result of which the gear 29 tends to turn clockwise. The direction of a force permitting the nut 27 and the gear 29 to turn counterclockwise when the screw 16 is rotated counterclockwise is opposite to the direction of a force permitting the gear 29 to turn clockwise. However, as the screw 16 and the nut 27, and similarly the screw 17 and the nut 28 are slid with respect to each other, the rotations and movements of the relevant members are effectuated in combination. That is, the rack 31 is moved in one direction within an angle formed by the arrows 15 and 22.

The direction and distance of movement of the rack 31 in this case will be described with reference to FIG. 4, in which the X and Y directions are orthogonal with each other and correspond to the arrows 15 and 22, respectively. When both of the screws 16 and 17 are turned simultaneously through a unitary rotational angle, the vector of movement of the double-helical gear rack 31 indicated at A in FIG. 4 is represented by the arrow 40 (A to B). When the screws 16 and 17 are turned simultaneously respectively counterclockwise and clockwise through the unitary rotational angle, the vector of movement of the rack 31 at the point A is represented by the arrow 41 (A to C). Under this condition, when only the screw 16 is turned through the unitary rotational angle, the rack 31 at the point A is moved to the point D as indicated by the arrow 42 (A to D). Similarly, when the screw 16 alone is turned through the unitary rotational angle, the rack 31 at the point A is moved to the point E as indicated by the arrow 43 (A to E). Accordingly, if only the screw 17 is turned through the unitary rotational angle after the screw 16 alone has been turned through the unitary rotational angle, then the rack at the point A reaches the point B moving along the line A-D-B. The vector 44 is equal to the vector 44. Therefore, if the screws 16 and 17 are turned through a predetermined rotational angle, then the rack 31 is moved to an aimed point whether the screws are turned simultaneously or one after another.

As is apparent from the above description, an object can be moved to a desired position by controlling the direction and amount of rotation of the two screws. The lead (the distance of movement of the nut when the screw makes one revolution) of the right-handed screw may be different from that of the left-handed screw; however, in this case, the ratio of the rotating speed of the right-handed screw to that of the left-handed screw should be in reverse proportion to the ratio of the lead of the former screw to that of the latter screw.

Now, specific examples of the movement mechanism according to the invention will be described. FIG. 5 is a schematic illustration showing the essential components of a 105 mm microfilm camera in a computer output microfilmer (COM). A stage 100 is moved two-dimensionally on a flat base plate 101, with a microfichefilm loaded thereunder. The size of the microfichefilm is 105 mm × 148 mm, and the stage 100 is movable over the range which covers the size. The arrangement of frames, in which images are recorded, in the microfichefilm is such that nine (9) frames are in a row and eight (8) frames are in a column, with the total number of frames equaling seventy-two (72). In this COM, an image to be recorded in each frame is optically projected through an opening formed at a particular portion of the base plate 101 (below the stage 100 in this example) from below the base plate 101. Accordingly, in this case, it is necessary to move the seventy-two frames of the microfichefilm to the opening quickly in a short settling time and with high accuracy.

The stage 100 is provided with sliding legs 102 at the four corners so that the stage 100 is moved with a predetermined space between the stage 100 and the base plate 101. Supporting plates 103 and 104 are fixedly secured to the base plate 101. Screws 105 and 106 are rotatably journaled through bearings on the supporting plates 103 and 104 in such a manner the screws 105 and 106 are in parallel with each other and the base plate 101. The screws 105 and 106 are individually rotated by motors 107 and 108, respectively. Helical gears 109, 110, 111 and 112 are placed over respective nuts, so that they engage the screws 105 and 106 through the nuts, respectively. One pair of helical gears 109 and 110 are disposed in such a manner that the direction of the teeth of the former crosses with that of the teeth of the latter, thus serving as one double-helical gear. The other pair of helical gears 111 and 112 are similarly disposed. It should be noted that in each pair of helical gears, one gear is spaced from the other gear. This is to minimize the effect of rotation moment to the stage which is moved as described later.

The helical gears 109 and 111 engage a helical gear rack 113 of the stage 100, while the helical gears 110 and 112 engage a helical gear rack 114 of the same. A block 115 is utilized to maintain the distance between the helical gears 109 and 110 and the distance between the helical gears 111 and 112 unchanged. The use of the block 115 is not always required. The diameter of each of the rubber rings 116, 117, 118 and 119 is substantially equal to that of the pitch circle of each helical gear. These rubber rings are in contact with the upper surface of the stage 100 to relieve the impact between the helical gears and the helical gear racks and to prevent the stage 100 from moving upwardly from the base plate 101 (to depress the stage 100 toward the base plate 101). Thus, the rubber rings serve also to prevent the vibration of the stage 100.

In the microfilm camera thus constructed, a step motor whose rotational angle per step is 1.8° is employed as each of the motors 107 and 108. The speeds of the motors were reduced to 1/1.8 to rotate the respective lead screws. The specifications of the lead screws and the helical gears used in this embodiment are as indicated in Tables 4 and 5. It takes 62 ms in response to a pulse frequency of 1,000 pps to move the microfichefilm 15.5 mm horizontally. In this embodiment, the movement is 0.25 mm/step in the X-direction and 0.125 mm/step in the Y-direction. Furthermore, the settling time is less than 25 ms. This settling time is sufficient for the microfilm camera in the COM.

TABLE 4

| Lead Screw | |
| --- | --- |
| Outside diameter | 15 mm |
| Pitch circle | 14.32 mm |
| Lead | 45 mm |
| Pitch | 3 mm |
| Number of threads | 15 |

TABLE 5

| Helical Gear | |
| --- | --- |
| Module | 0.5 |
| Number of teeth | 41 |
| Pitch circle | 28.65 mm |
| Addendum circle | 29.65 mm |
| Helix angle of thread | 44.31° |
| Height of teeth | 1.125 mm |
| Lead | 92.20 mm |

The above-described movement mechanism may be modified within the spirit of the invention. For instance, the combinations of the screws and the nuts may be replaced by the combinations of screws and bolt nuts. The step motor may be replaced by a servo motor which is feedback-controlled. In each pair of helical gears engaging with the respective helical gear racks, the direction of the teeth of one gear intersects that of the teeth of the other gear; however, this engagement mechanism may be such that a double-helical gear engages the rack.

Alternately, a pin is provided on the lower surface of the block 115 in such a manner to protrude into a groove which is cut in the upper surface of the stage to be in parallel with the racks. Hence, the racks are movable in the X-direction but not in the Y-direction, that is, any means may be employed if it permits the racks to move in the X-direction but not in the Y-direction. In this case, the racks may be of a spur gear.

In FIG. 3, two gears engage with one helical gear rack; however, in the case where two gears are spaced apart from each other in the direction of the axis of the respective screw as shown in FIG. 5, a helical gear rack may engage with each gear. Furthermore, the lead screw may be replaced by a ball screw including balls between a nut and a screw. Also, although the stage is shown in sliding contact, it is obvious that rollers may also be used.

Another example of the movement mechanism according to the invention, which moves on a base plate whose surface is not planar, will be described with reference to FIG. 6. In this example, the base plate is a cylindrical surface whose rotational axis is in parallel with the two screws. More specifically, the upper surface of the base plate 201 is a cylindrical surface whose rotational axis is in parallel with the two screws 105 and 106. The upper surface of the base plate 201 shown in FIG. 6 is a convex surface; however, it should be noted that the technical concept of the invention can be similarly applied to the case where the upper surface is a concave surface.

The fundamental difference between the movement mechanism in FIG. 5 and that in FIG. 6 resides in that the stage in the former Figure has a flat surface while the stage in the latter has a cylindrical surface. Accordingly, the principle of the movement mechanism shown in FIG. 6 is similar to that of the movement mechanism shown in FIG. 5, and therefore the detailed description of the principle of the movement mechanism in FIG. 6 will be omitted.

In FIG. 6, those components which have been previously described with reference to FIG. 5 have therefore been similarly numbered. Helical gear racks 213 and 214 are cut in the cylindrical upper surface of the stage 200, which has sliding legs 202 so that it can slide along the upper surface of the base plate 201. In this example, the direction of X' is curved, and therefore the movement in the direction of X' corresponds to the movement angle of the stage as viewed from the rotational axis described above. In the case where, for instance, the focal plane of a scanning light forms a curved surface as in a laser scanning optical system, a curved surface coincident with the first mentioned curved surface may be employed as the surface of the stage which is moved on the cylindrical surface as shown in FIG. 6.

According to the invention, the two drive sources (such as electric motors) are equivalent in characteristic to each other. It is unnecessary that the torque of one of the two drive sources is greater than that of the other. For the same reason, the design of the X-Y movement mechanism can be readily achieved. Furthermore, since the two motors are rotated simultaneously, the total output torque is twice as high. Accordingly each motor may be of a small torque, and the size of the X-Y movement mechanism can be significantly reduced. In addition, according to the invention, the settling time of the X-Y movement mechanism is very short. More specifically, the settling time of the conventional X-Y movement mechanism is of the order of 50 ms, but that of the X-Y movement mechanism according to the invention is of the order of 25 ms.

It is apparent that other modifications to this invention can be made without departing from the essential aspect of this invention.

What is claimed is:

1. An X-Y movement mechanism, comprising a right-handed screw and a left-handed screw arranged in parallel with each other; drive means for individually rotating said lead screws; gear means mounted on said screws; a base plate; a stage movable with respect to said base plate; and a rack fixedly provided on said stage to engage said gear means wherein said gear means operate as a gear transmission mechanism permitting said rack to move in a direction perpendicular to the direction of the axes of said screws or in the direction of the axes of said screws.

2. The mechanism of claim 1 wherein said base plate is a flat surface in parallel with the plane defined by the axes of said screws.

3. The mechanism of claim 1 wherein said base plate is a cylindrical surface having an axis of rotation parallel to the axes of said screws.

4. The mechanism of claim 1, wherein said drive means comprises first and second step motors to individually drive said screws.

5. The mechanism of claim 1, wherein said drive means comprises first and second servo motors to individually drive said screws.

6. The mechanism of claim 1 wherein said gear means comprises a nut operably engaging the thread of a screw and a gear mounted about said nut.

7. The mechanism of claim 6 wherein said gear comprises a double helical gear engaging said rack.

8. The mechanism of claims 1, 2 or 3 wherein said stage has legs to position it above said base plate.

9. The mechanism of claim 1 further comprising a centering block to maintain a fixed distance between said screws.

10. The mechanism of claims 1 or 9 wherein said gear means comprises a pair of nuts mounted on the threads of each screw and a double helical gear mounted on the outside of each nut.

11. The mechanism of claims 1 or 9 further comprising vibration damping means mounted on said lead screws in contact with said stage.

12. The mechanism of claim 11 wherein said vibration damping means comprise rubber rings having a diameter substantially equal to the diameter of said gear means.

13. The mechanism of claims 1, 4, 5, 6 or 9 wherein said screws are lead screws.

* * * * *